US009662797B2

(12) United States Patent
Dammertz et al.

(10) Patent No.: US 9,662,797 B2
(45) Date of Patent: May 30, 2017

(54) GUARD DEVICE FOR A TABLE SAW

(71) Applicants: Robert Bosch Tool Corporation, Broadview, IL (US); Robert Bosch GmbH, Stuttgart (DE)

(72) Inventors: Ralph Dammertz, Stuttgart (DE); Juergen Wiker, Schaumburg, IL (US)

(73) Assignees: Robert Bosch Tool Corporation, Broadview, IL (US); Robert Bosch GmbH, Stuttgart, DE (US)

( * ) Notice: Subject to any disclaimer, the term of this patent is extended or adjusted under 35 U.S.C. 154(b) by 439 days.

(21) Appl. No.: 14/077,463

(22) Filed: Nov. 12, 2013

(65) Prior Publication Data

US 2014/0130643 A1    May 15, 2014

Related U.S. Application Data

(60) Provisional application No. 61/725,540, filed on Nov. 13, 2012.

(51) Int. Cl.
| | |
|---|---|
| *F16D 9/00* | (2006.01) |
| *B26D 5/00* | (2006.01) |
| *B26D 5/08* | (2006.01) |
| *B23D 45/06* | (2006.01) |
| *B23D 59/00* | (2006.01) |
| *B27G 19/02* | (2006.01) |

(52) U.S. Cl.
CPC ........... *B26D 5/086* (2013.01); *B23D 45/061* (2013.01); *B23D 59/001* (2013.01); *B27G 19/02* (2013.01); *Y10T 83/04* (2015.04); *Y10T 83/533* (2015.04); *Y10T 83/541* (2015.04)

(58) Field of Classification Search
CPC .... B26D 5/086; B23D 45/061; B23D 59/001; B27G 19/02; Y10T 83/04; Y10T 83/533; Y10T 83/541
USPC ................. 83/76.6, 76.7, 522.12; 700/12, 13
See application file for complete search history.

(56) References Cited

U.S. PATENT DOCUMENTS

| | | | | |
|---|---|---|---|---|
| 4,674,374 | A * | 6/1987 | Sadahiro | B23D 55/043 83/360 |
| 8,670,844 | B2 * | 3/2014 | Krapf | F16P 3/14 192/129 R |
| 2002/0020262 | A1 * | 2/2002 | Gass | B23D 59/001 83/58 |

(Continued)

FOREIGN PATENT DOCUMENTS

| | | |
|---|---|---|
| WO | 03/006213 A2 | 1/2003 |
| WO | 2010/059786 A1 | 5/2010 |

OTHER PUBLICATIONS

International Search Report and Written Opinion corresponding to PCT Application No. PCT/US2013/069715, mailed Jan. 31, 2014 (10 pages).

*Primary Examiner* — Omar Flores Sanchez
(74) *Attorney, Agent, or Firm* — Maginot Moore & Beck LLP (57) ABSTRACT

A guard device for a saw system in which the table saw is not operated without a saw blade guard, unless a user intends to make a non-through cut in a workpiece. The guard device, in one embodiment, determines whether an adjusted saw blade height corresponds to a thickness of the work piece to be cut and prevents the tool or motor driving the saw blade from operating if the saw blade is adjusted too high, in order to improve work conditions.

16 Claims, 12 Drawing Sheets

(56) References Cited

U.S. PATENT DOCUMENTS

| | | | | |
|---|---|---|---|---|
| 2004/0226424 A1* | 11/2004 | O'Banion | ............... | B23D 47/08 |
| | | | | 83/397 |
| 2010/0106284 A1 | 4/2010 | Krapf et al. | | |
| 2010/0147124 A1* | 6/2010 | Seidel | ................... | B23D 59/001 |
| | | | | 83/72 |
| 2016/0016240 A1* | 1/2016 | Koegel | ................... | B23D 47/12 |
| | | | | 83/76.8 |

* cited by examiner

GUARD DEVICE FOR A TABLE SAW

This application claims priority to U.S. Provisional Patent Application Ser. No. 61/725,540 entitled "Guard Device for a Table Saw" by Dammertz et al., filed Nov. 13, 2012, the disclosure of which is incorporated herein by reference in its entirety.

TECHNICAL FIELD

This disclosure relates to a powered saw and more particularly to a guard device for a table saw.

DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

Figure 1:
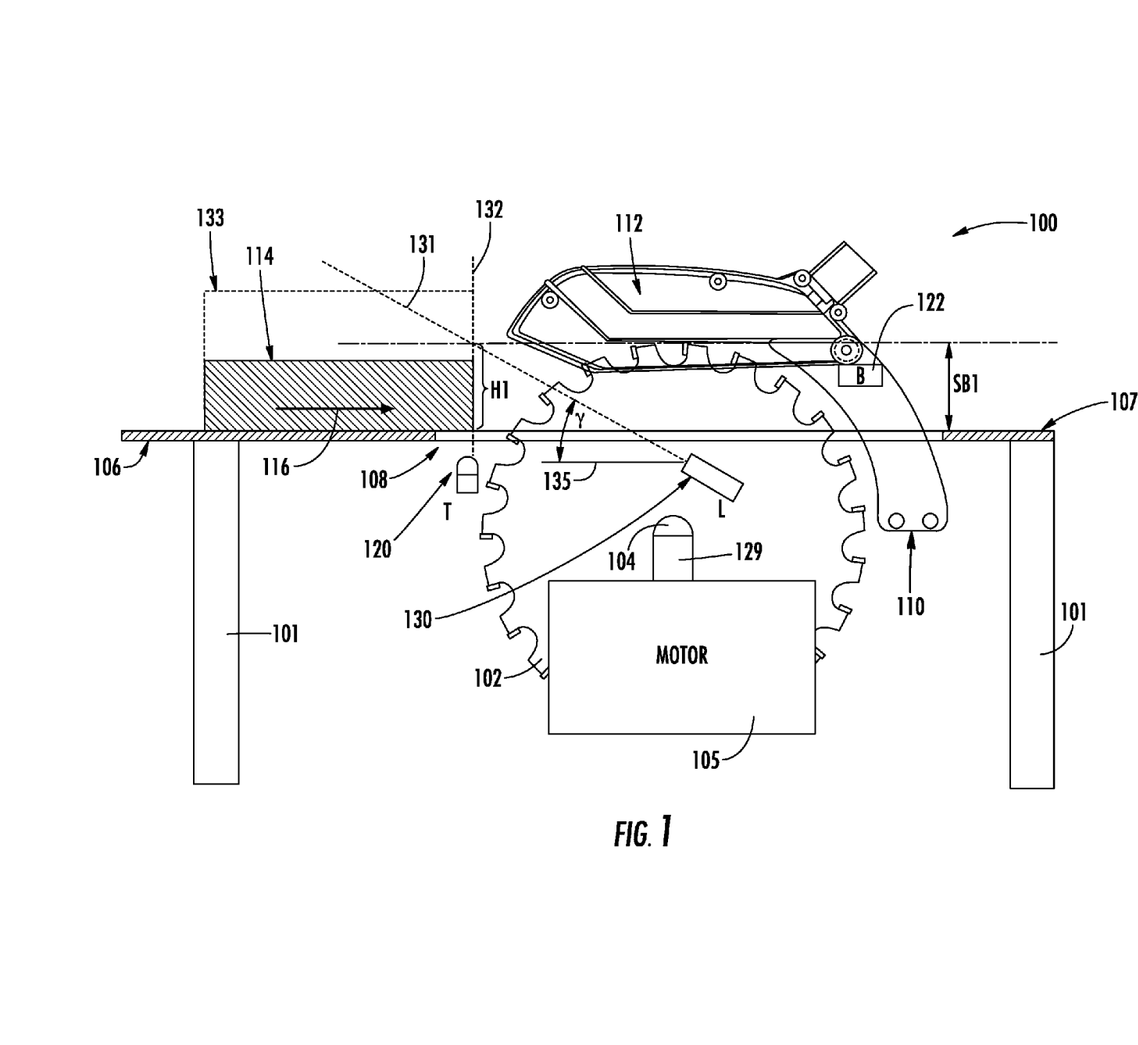
FIG. 1 is a schematic view of a table saw including a workpiece detection system configured to detect a thickness of a work piece being cut by a table saw.

FIG. 1 illustrates a saw system 100 including a frame 101 to provide support for a saw blade 102 supported for rotational movement about an axis 104. The saw system 100, in different embodiments, includes a table saw, a miter saw, a bevel saw, a band saw, a planar saw, a vertical saw, or the like. In this embodiment, the saw system 100 is a table saw. A motor 105 rotates the saw blade about the axis 104. The saw blade 102 extends from a bottom side 106 of a table top 107 through a blade opening or slit 108. A riving knife 110 is supported by the saw blade carriage 129 of the table saw 100. A blade guard 112 is adjustably and removably supported by the riving knife 110. During operation, the blade 102 rotates counterclockwise to cut a workpiece 114 which is moved into contact with the blade 102 along a feeding direction 116. As described herein, a workpiece detection system is configured to determine one of the presence of a workpiece and a height of a workpiece, and whether an operating condition presents a situation in which a corrective action is necessary to prevent or reduce the occurrence of an undesirable operating condition.

A transceiver 120 is mounted under the table top 107 in close proximity to the front of the saw blade 102. The transceiver 120 emits a light beam (pulsed or continuous) in an upward direction through the saw blade opening 108 in the table top 107. The transceiver 120 detects the presence of a workpiece by measuring the light which is reflected from the workpiece back to the transceiver 120. In one embodiment, the transceiver 120 is a close range LED (light emitting diode) transceiver and is located such that the workpiece 114 moves directly above the location of the transceiver 120. Alternatively, transceiver 120 could also be a laser sensor or an IR (infrared) sensor. A micro switch or blade guard sensor 122 is mounted at the riving knife 110, or other predetermined location(s), to detect if the blade guard 112 is mounted on the riving knife 110. Alternatively, the micro-switch could be a simple magnetic sensor, a hall sensor or an optical sensor.

A laser sensor 130 is mounted beneath the table top 107 and is slightly offset sideways to the cutting plane of blade 102, but in close proximity to the blade 102. This location enables the emitted laser beam to transmit a beam of light through the saw blade opening 108 and past the top surface of the table top 107. The laser sensor 130 is also used to detect the presence of the workpiece 114 as the laser beam is reflected off the workpiece. In one embodiment, the laser sensor 130 is not used to measure a distance from the laser sensor to the workpiece 114. The laser sensor 130 includes an emitter/detector to transmit a laser beam and to detect a laser beam. In another embodiment, separate components are used.

The laser sensor 130 may be mounted to a saw blade carriage 129 to move up and down together with the saw blade 102 to set the desired saw blade height SB 1. While the saw blade carriage 129 is generically depicted, any saw blade carriage, either fixed or adjustable, is possible as would be understood by those skilled in the art. The laser sensor 130 is mounted at an angle γ with respect to the table top, so that at the intersection of a beam 131 emitted from laser sensor 130 and a light beam 132 emitted from transceiver 120, the intersection height H1 is exactly equal to SB1. The angle γ is defined by the beam 131 and a line 135 substantially parallel to the plane of the table top 107.

For regular through-cuts, the saw blade height SB1 can be adjusted to be only slightly higher than the height of the workpiece 114. There is no real recommendation for setting the saw blade height above the workpiece, but for safety reasons the additional height should be kept to plus approximately 3-6 mm. The additional 3-6 mm ensures that the workpiece is always cut cleanly through even if there are some thickness variations within the workpiece. For simplicity reasons the following descriptions assume that for a through cut the saw blade height only needs to be adjusted to match the workpiece height. An outline 133 illustrates a boundary of a non-through cut workpiece for comparison.

Figure 2:
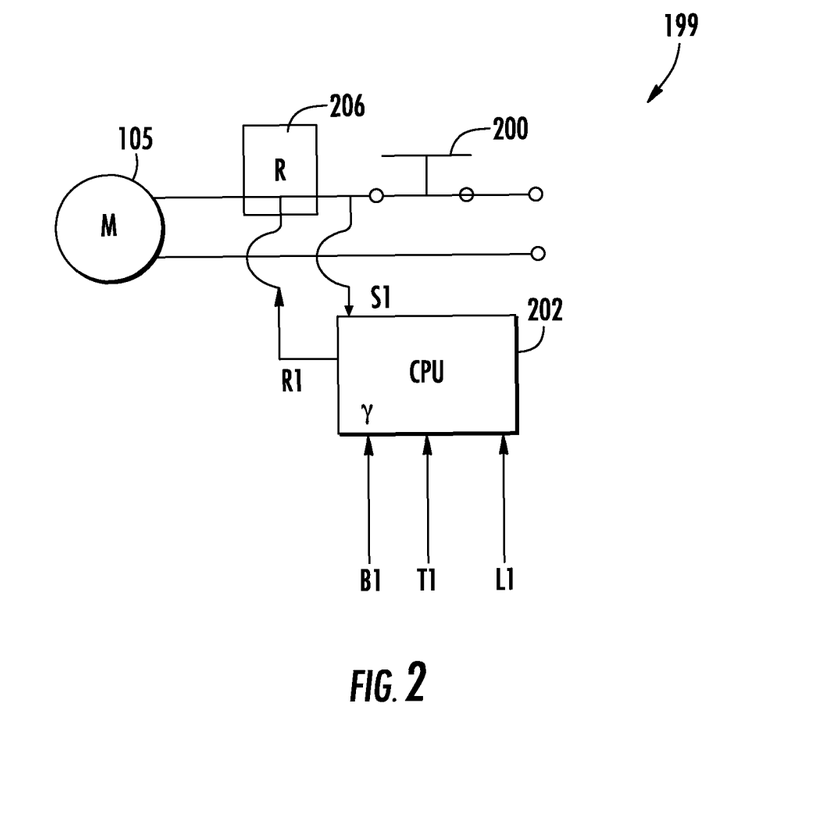
FIG. 2 is a schematic circuit diagram of a guard device circuit.

FIG. 2 is a schematic circuit diagram of a guard device circuit 199. The guard device circuit 199 operates in response to the following conditions shown in Table 1.

TABLE 1

Signals

Figure 3:
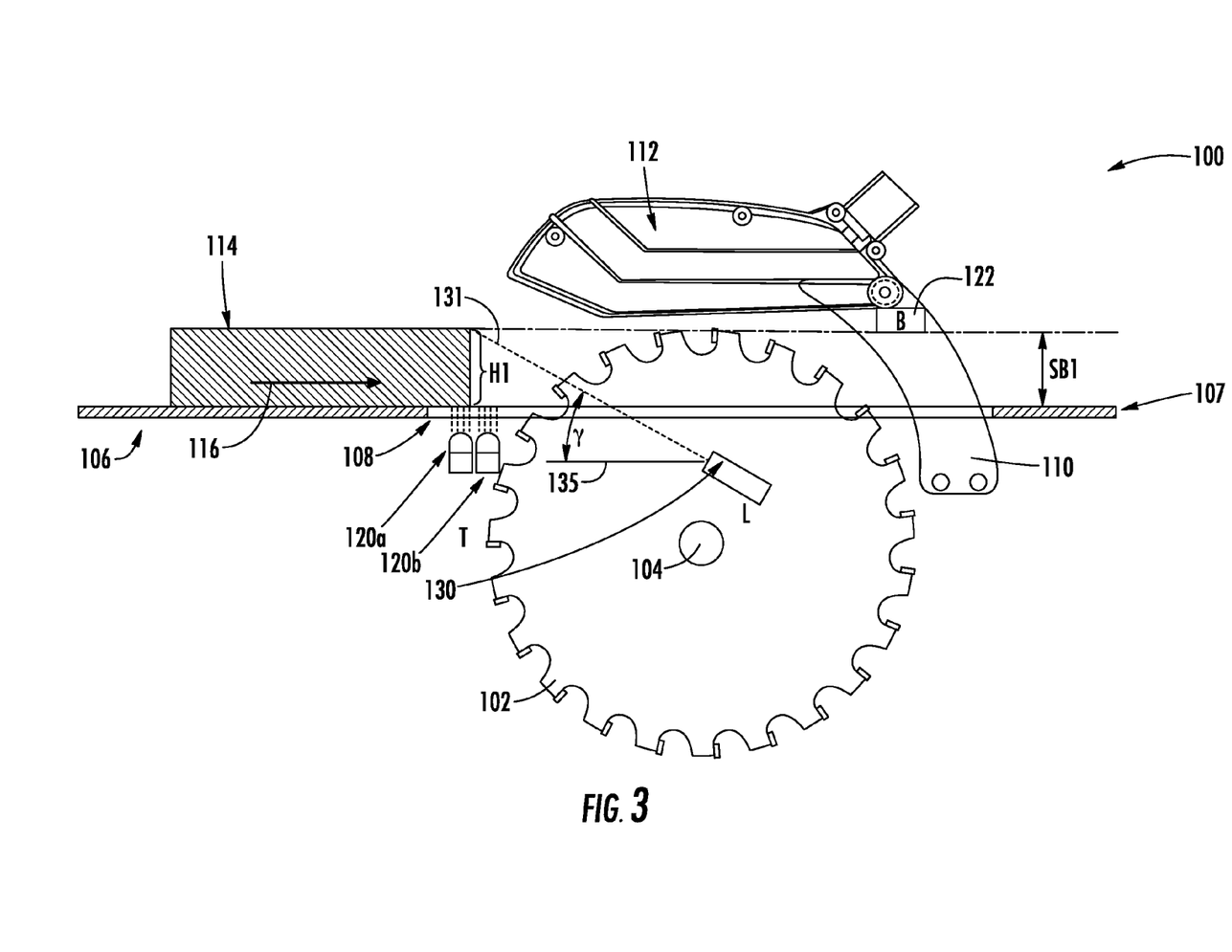
FIG. 3 is a schematic view of regular through cut being made by a table saw with a blade guard present.

S1 = 0: switch "off"
S1 = 1: switch "on"
B1 = 0: no blade guard mounted
B1 = 1: blade guard mounted
T1 = 0: no work piece
T1 = 1: work piece present
L1 = 0: no work piece detected
L1 = 1: work piece detected
R1 = 0: relay open
R1 = 1 relay closed When the blade height corresponds to the workpiece height, as illustrated in FIG. 3, a user turns a switch 200 of the guard device circuit 199 to the on position where the switch is closed (S1=1), and the blade guard presence is detected by the microswitch 122 (B1=1). Table 2 indicates signal states of the circuit 199 of FIG. 2 under the conditions illustrated in FIG. 3.

TABLE 2

Signals:

S1 = 1: Switch on
B1 = 1: blade guard mounted
T1 = 1: work piece on table
L1 = 1: work piece in range
=> Through cut, motor can be switched on
R1 = 1: relay on => motor on Both the switch 200 and the micro switch 122 are coupled to a CPU (central processing unit) 202. The CPU 202 turns the motor 105 on by setting a switching relay 206 on and setting R1, an output of the CPU 202, from O to 1. The motor 105 is running and the user can start feeding a workpiece towards the saw blade 102. Eventually, the workpiece is moved over the LED transceiver 120a. The LED transceiver 120a transmits a light beam which is reflected off the workpiece 114 when present in the path of the workpiece 114. If a workpiece presence is detected, the LED transceiver 120a sends a signal to the CPU 202, thereby setting the value of T1=1. Once the presence of the workpiece 114 is detected, laser sensor 130 transmits a pulsed laser beam at a high frequency. In another embodiment, the laser sensor 130 can transmit the pulsed laser beam before the workpiece 114 is detected. As the user feeds the workpiece towards the saw blade 102, the laser beam hits the workpiece first on the top corner and the beam is reflected back to the laser sensor L. As soon as a workpiece is detected, the laser sensor 130 sends a signal to the CPU 202 thereby setting the value of L1=1. The CPU 202 continuously monitors all conditions of the laser 130, LED transceiver 120, and microswitch 122. In one embodiment, the workpiece detection system includes the laser 130, the transceiver 120a and the circuit 199. In one embodiment, the CPU 202 sets the condition of the relay 206 such that the relay signal R is an output signal from the CPU. In one embodiment, the relay signal R does not need to be monitored constantly, as opposed to the LED, laser, and switch signals which are input signals and which are monitored on a continual basis since these signals change depending on the user actions.

While the embodiments described herein include the use of CPUs, the embodiments are not limited to the use of CPUs. In other embodiments, the processing units include processors having included memory and/or external memory, arithmetic logic units, microprocessors, and programmable logic controllers. In addition, dedicated or general logic circuits as well as switching devices are possible. In general, any processor systems configured to receive and to provide information in the form of signals, either analog or digital, are included.

A regular through cut with a correctly adjusted saw blade height is carried out only if the sensor 120a and sensor 130 detect the workpiece at substantially the same time. Hence, L1 and T1 change their condition from O to 1 at the same time. If T1 and L1 change their condition from 0 to 1 at different times, this means the saw blade and workpiece are not matching and the possibility of a proper through cut is determined to be unlikely in view of the conditions described further below.

In another embodiment, an additional sensor 120b is disposed adjacent to the sensor 120a which is closer to the saw blade 102 than is the sensor 120a. In this embodiment, the signal along line 131 turns high while sensor 120a is high and sensor 120b is low. The distance between the sensors 120a and 120b determines the allowable margin of saw blade exposure above the work piece.

Figure 4:
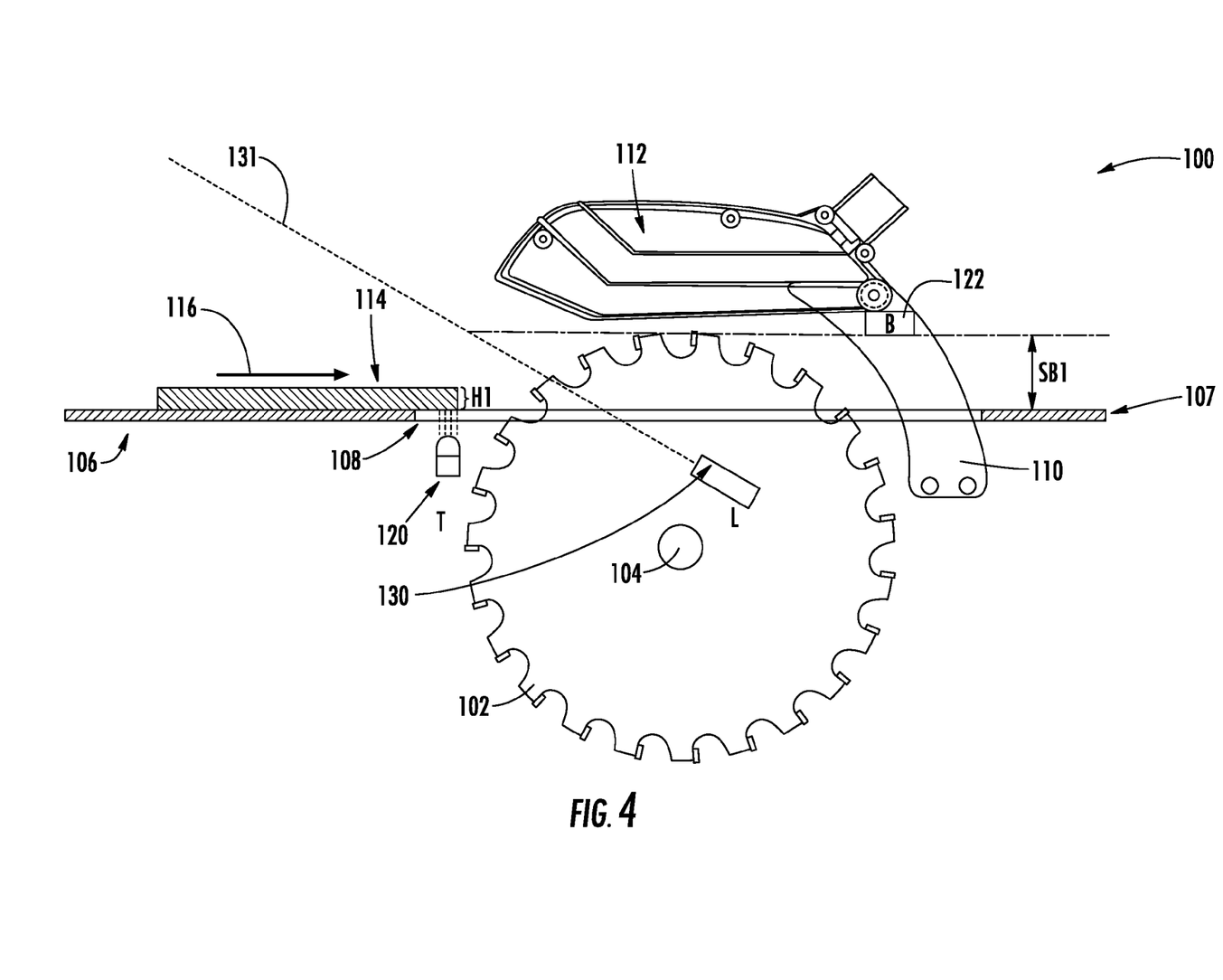
FIG. 4 is a schematic view of a through cut being made by a table saw with a saw blade being set too high for the work piece height.

As illustrated in FIG. 4, the saw blade 102 is adjusted to be quite a bit higher than the workpiece thickness, which is not necessary to make the cut. During cutting, a big portion of the blade 102 would be exposed above the workpiece, making it more likely for the user to come in contact with the blade. In this configuration, the transceiver 120 detects the workpiece before the laser sensor 130, hence T=1 and L is still O. The CPU 202 detects this condition and generates a signal by setting R1 to 0 to switch the tool off. In this condition, the status of the various signals is shown in the following Table 3. In another embodiment, a clutch is disposed between the motor and the saw blade, such that upon setting of R1 to zero, the clutch is disengaged thereby not delivering a rotational force to the saw blade.

TABLE 3

Figure 5:
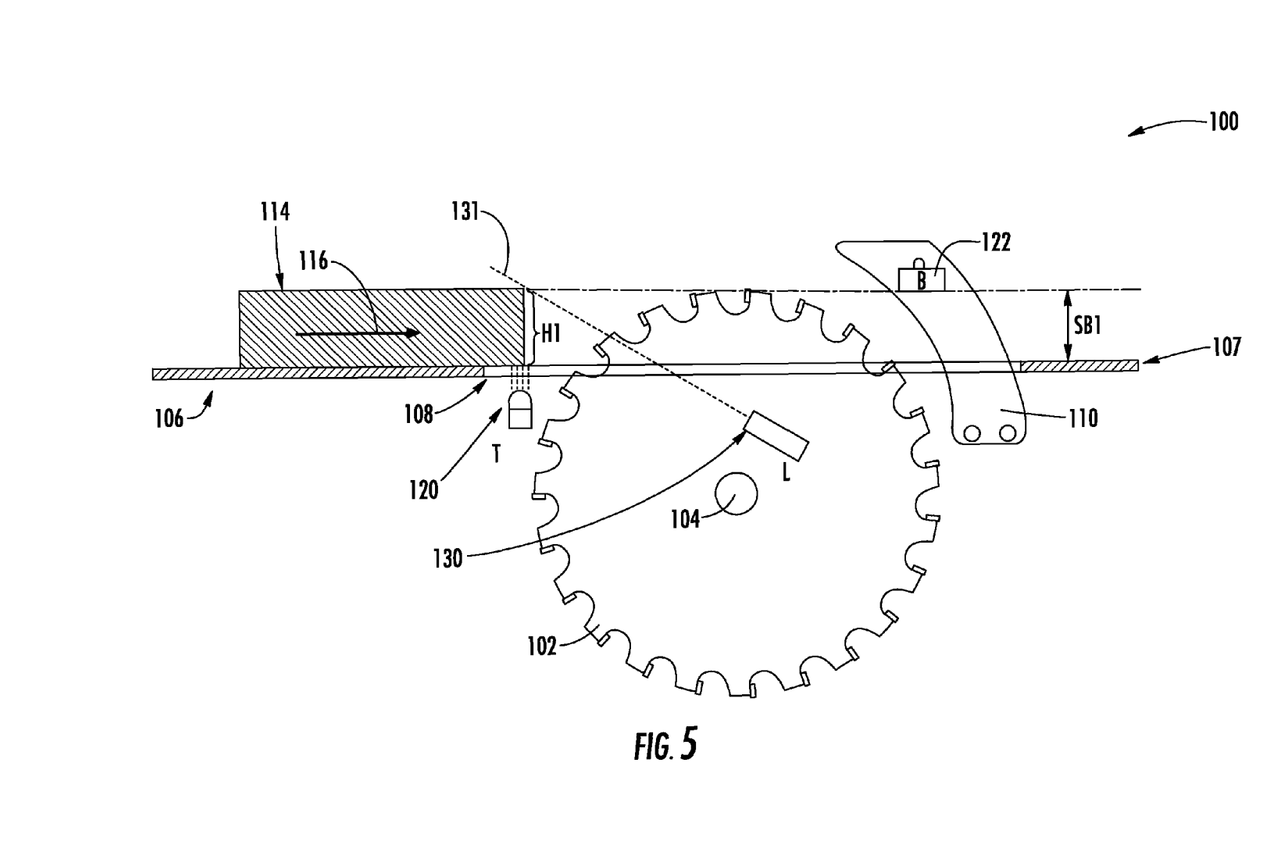
FIG. 5 is a schematic view of a through cut being made by a table saw with a height of a saw blade being adjusted correctly but with the blade guard not being present.

Signals:

S1 = 1: Switch on
B1 = 1: blade guard mounted
T1 = 1: work piece on table
L1 = 0: no work piece detected
=> Through Cut, but saw blade too
High for work piece => Relay off
R1 = 0 => motor off As illustrated in FIG. 5, a condition similar to the one illustrated in FIG. 3 exists, but in this condition the CPU 202 detects that the blade guard is not present, hence B1=0. In this case the user would not be allowed to operate the tool and the CPU 202 switches the tool off, or prevents power from being applied to the motor 105, by setting R1 to 0. In this condition, the status of the various signals is shown in the following Table 4.

TABLE 4

Signals:

S1 = 1: Switch on
B1 = 0: blade guard not mounted
T1 = 1: work piece on table
L1 = 1: work piece in range
=> Through cut but no guard:
Relay off R1 = 0-> Motor off.

Figure 6:
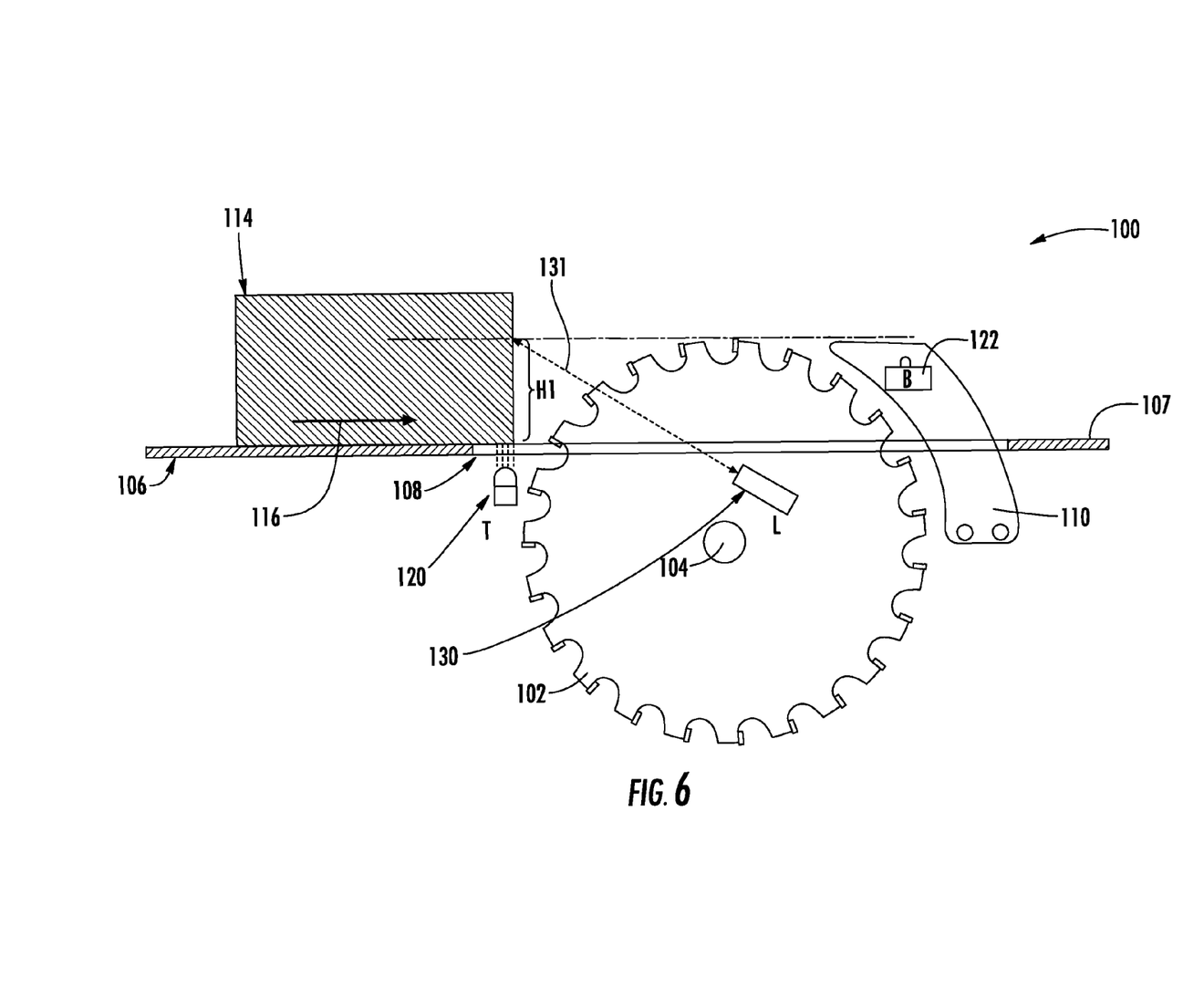
FIG. 6 is a schematic view of a non-through cut being made by a table saw with a height of a saw blade being adjusted correctly but with the blade guard not being present.

FIG. 6 illustrates a condition in a regular non-through cut, where the guard 112 has been taken off, hence B=0. In order to detect a non-through cut, the workpiece needs to be higher than the saw blade height setting and the laser 130 must detect the workpiece before detection by the transceiver 120, meaning L=1 and T is still 0. A non-through cut is detected. Since this is a regular non-through cut due to the height of the workpiece 114 where the guard has been taken off, the motor keeps running, R1=1. Table 5 illustrates the various states.

TABLE 5

Signals:

S1 = 1: Switch on
B1 = 0: blade guard not mounted
T1 = 1: work piece on table
L1 = 1: work piece in range
Non-through cut R1 = 1: relay
stays on, => Motor on In another condition, similar to that illustrated in FIG. 6, the blade guard 112 is present, but the cut cannot be made due to the height of the workpiece 114 being higher than the lowest portion of the blade guard 112. This condition happens if the user neglects to take the guard 112 off. In this condition, the user attempts to raise the height of the saw blade to meet the height of the workpiece 114 and make a through cut. The saw blade would eventually contact or collide with the guard 112 in the event the saw blade is continued to be raised in embodiments where the guard does not move with movement of the carriage. The described guard system detects this condition by receiving the following signals from the laser 130, the sensor 120 and the microswitch 122: L1=1 and T=0, but B1=1. The CPU 202 would turn the tool off by setting R1=0. In the above described set up, the transceiver 120 can also be used to detect the workpiece material type.

Figure 7:
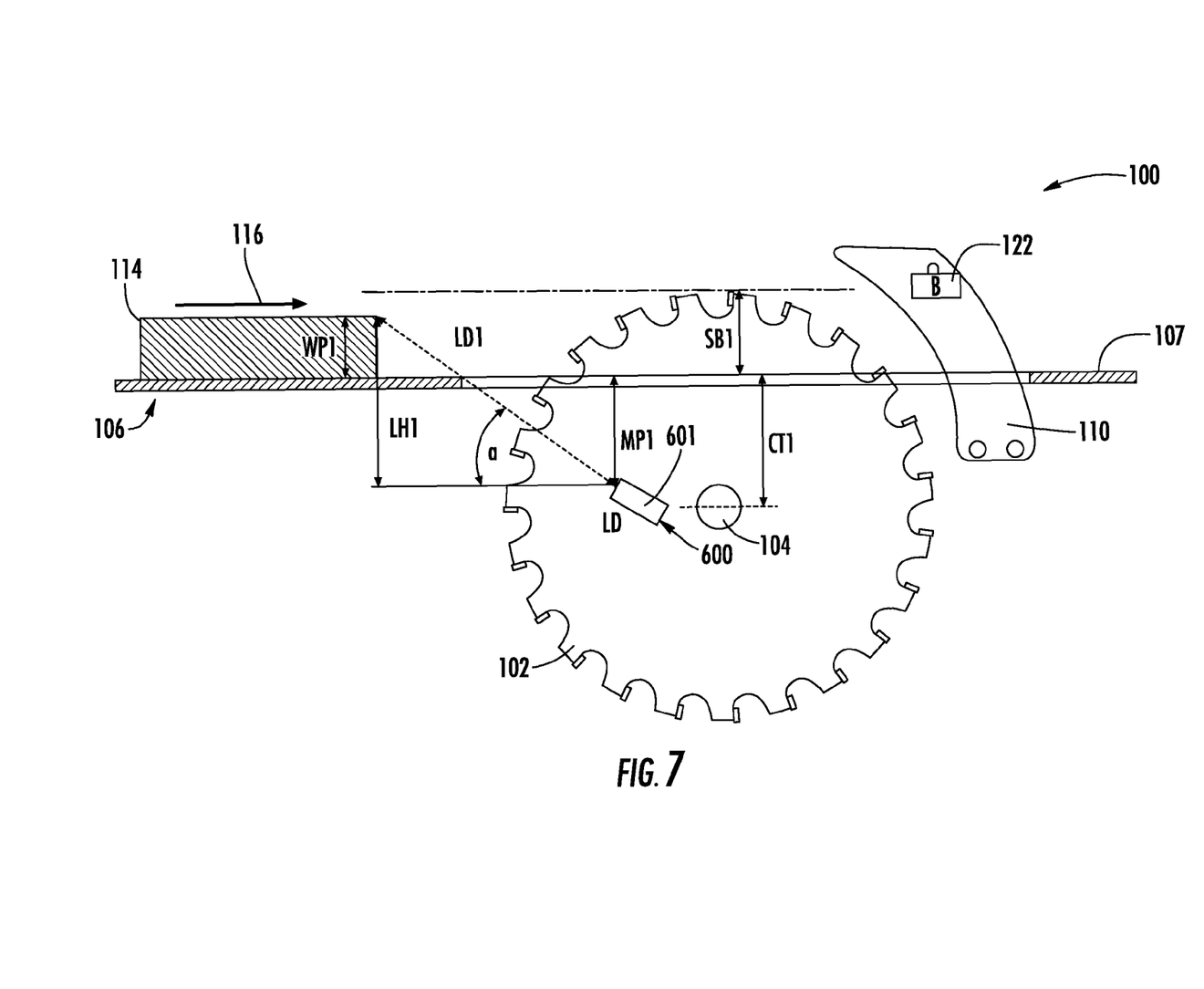
FIG. 7 is a schematic view of another embodiment of a through cut being made by a table saw with a saw blade being set too high for the work piece.
Figure 8:
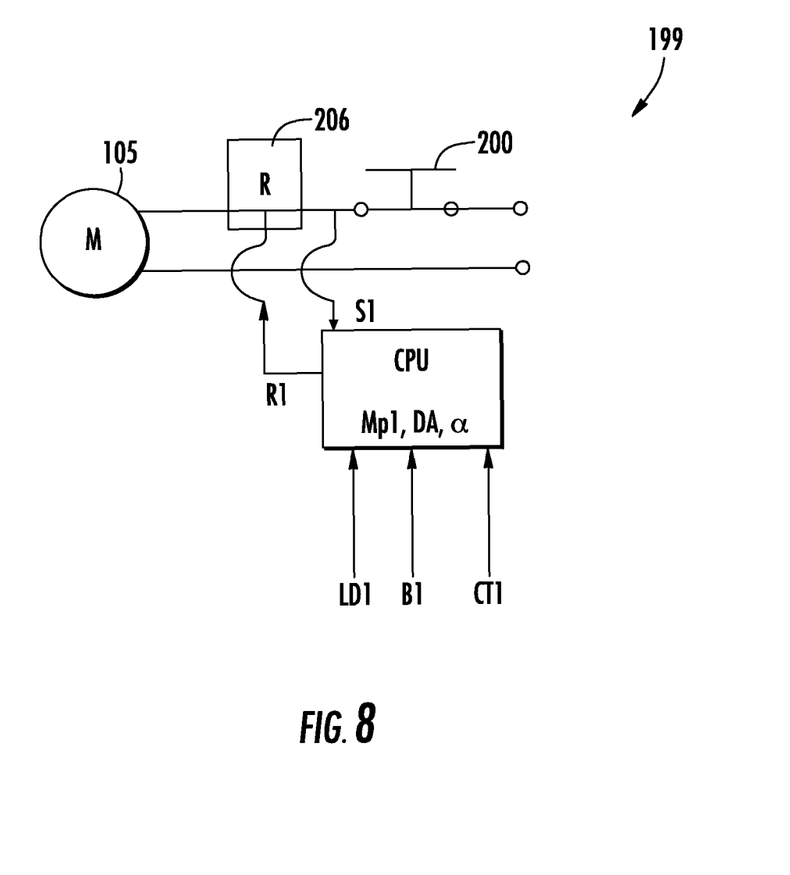
FIG. 8 is a schematic circuit diagram of another embodiment of a guard device circuit.

FIG. 7 illustrates another embodiment of the present disclosure including a method of detecting and distinguishing non-through cuts from through cuts by using a laser distance (LD) measurement system 600. This laser distance measurement system 600 transmits a laser beam from a laser 601, detects the reflection off the workpiece 114, and measures the time from transmitting the laser beam to receiving a reflected signal. The laser beam travels with the speed of light and by measuring the time to receive a signal reflected back, the distance LD1 from the laser diode to the object (workpiece) is calculated as:

$$LD1 = \frac{1}{2} * c * t,$$

where c is the speed of light and t is the measured time. Since laser beams travel with the speed of light, a relatively complex electronic circuitry is provided in the system 600 to measure the time with the required accuracy. Such systems and circuits are commercially available and can be obtained from a number of vendors. FIG. 8 illustrates circuit 199 indicating signal input lines.

In the embodiment of FIG. 7, laser 601 is mounted at a fixed position to the saw frame at a predetermined distance MP1 below the top surface of the table top 107 and at a predetermined angle α with respect to the table top 107. With this information, the workpiece height, WP1, is calculated and the CPU 202 determines if a non-though cut is a possibility under the detected conditions. To use the laser system 600, the user switches on the tool by turning on the device to set the switch such that S1=1. The CPU 202 then detects that no blade guard present B1=0 and turns on relay 206 such that R=1. The laser 601 of the laser system 600 sends a laser beam through the opening 108 in the table top towards the front of the tool or at a location between the saw blade 102 and the workpiece 114. As the user feeds the material towards the saw blade 102, the laser beam eventually contacts the workpiece on the upper corner of the workpiece first. At this time the distance LD1 is calculated and the value of LD1 is sent to the CPU 202. With the values of α and MP1 (factory pre-set parameters which are permanently stored in the CPU 202), the value for LH1 can simply be calculated as H1=LD1*sin (α) and the actual workpiece height is calculated as WP1=LH1−MP1. To decide if there is a non-through cut or a through cut being performed, the CPU 202 calculates the actual saw blade height setting SB1 above the table top using the relationship SB1=DA/2−CT1. DA is the actual saw blade diameter which is stored as fixed value in the CPU 202 or which can be entered manually into the CPU 202 by the user. In another embodiment, the diameter of the saw blade can be measured by another measurement device, like a laser range finder or a similar device, not shown. CT1 is the distance from the center of the saw blade to the table top. This value is measured by a measurement device CT (not shown) that can be mounted to the saw blade carriage to move up and down together with the saw blade, as adjusted by the user. The measurement device CT may be a commonly used device such as a glass-scale, as found in many industrial type machines, like lathes or mills and is not described here in further detail.

After the values SB1 and WP1 are calculated, they are compared with each other. If the saw blade height SB1 is greater than the workpiece height WP1, the tool is turned off since a through cut without the guard mounted in place has been considered, which is considered an undesirable condition. If the saw blade height SB1 is smaller than the actual workpiece height WP1, then the tool is allowed to stay on (R1=1), since this relationship shows a non-though cut and the guard has to be off. Table 6 illustrates the various states for the embodiment of FIG. 7.

TABLE 6

Signals:

S1 = 1: Switch on
B1 = 0: blade guard not mounted
WP1: calculated work piece height
SB1: calculated saw blade height
WP1 < SB1 => R1 = "0"
WP1 >= SB1 => R1 = "1"

Since the CPU 202 calculates the actual height of the workpiece, and also determines the actual saw blade height setting, in another embodiment, the system of FIG. 7 is configured to automatically adjust the saw blade height to correspond with the workpiece height. To do this, a small motor (not shown) is connected to a height adjustment device which is used to adjust the saw blade height. The height adjustment device is operatively connected to a saw blade carriage to adjust the position of the saw blade. In case the saw blade height is too high for the actual workpiece, the motor can make automatic adjustments based on the calculation of the CPU 202.

Figure 9:
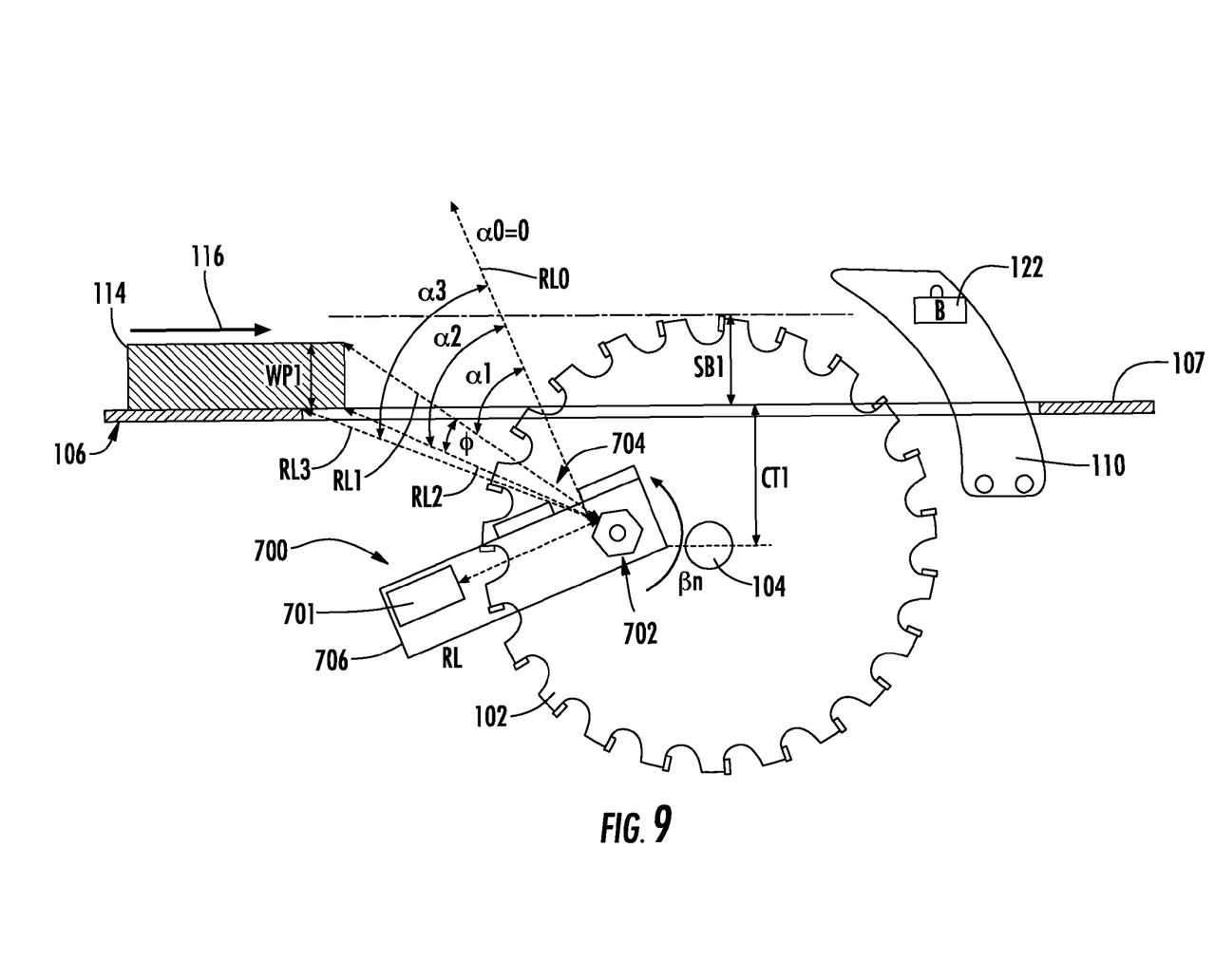
FIG. 9 is a schematic view of another embodiment of a through cut being made by a table saw with a saw blade being set too high for the work piece using a rotating laser to detect an operating condition.

FIG. 9 illustrates another embodiment including a method using a rotating laser system 700. In this embodiment, the rotating laser system 700 transmits a pulsing laser beam from the laser 701 which hits a rotating mirror 702. The mirror 702 deflects the laser beam through an opening 704 in a laser housing 706 upwards towards the workpiece 114. The opening 704 in the housing 706 enables the laser beam to be emitted in angles of between $\alpha 0$ and $\alpha 3$. Rotational angles $\beta_n$ of the mirror 702 correlate with the angles of the emitted light beams $\alpha_n$ and are provided as input for calculations to the CPU 202. The CPU 202 continuously measures the amount of time the laser beam travels from the laser diode to the mirror, to the workpiece and along the return paths. The distance from the laser diode 701 to the mirror 702 is a known constant value and the time from the laser to mirror and back to the laser is subtracted from the total run time, in order to get only the distance from mirror to the workpiece.

Figure 10:
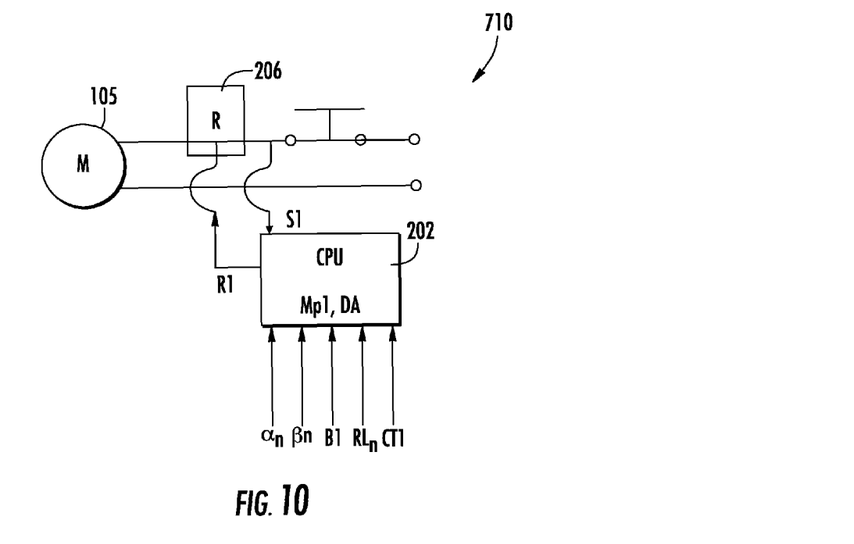
FIG. 10 is a schematic circuit diagram of another embodiment of a guard device circuit.

FIG. 10 illustrates an alternative circuit 710 indicating signal input lines. In this circuit, the motor 105, CPU 202, and relay 206 are included as in the prior circuit embodiments. In this alternative, however, the CPU 202 is configured to receive the inputs as illustrated in the figure and described herein.

In the example shown in FIG. 9, the laser beam at $\alpha 0$ cannot hit the workpiece so the CPU 202 times out and does not measure any value. As the user moves the workpiece towards the saw blade, the laser beams starts hitting the workpiece at the angle $\alpha 1$. At this time, the distance from the workpiece to the mirror RL1 is calculated. As the user continues to push the workpiece towards the saw blade, more distance readings at different angles are generated e.g. RL2 and RL3, and these values are stored in the CPU 202. Table 7 illustrates the various states for the embodiment of FIG. 9.

TABLE 7

Signals:

S1 = 1: Switch on
B1 = 0: blade guard not mounted
WP1: calculated work piece height
SB1: calculated saw blade height
WP1 < SB1 => R1 = "0"
WP1 > SB1 => R1 = "1"

Figure 11:
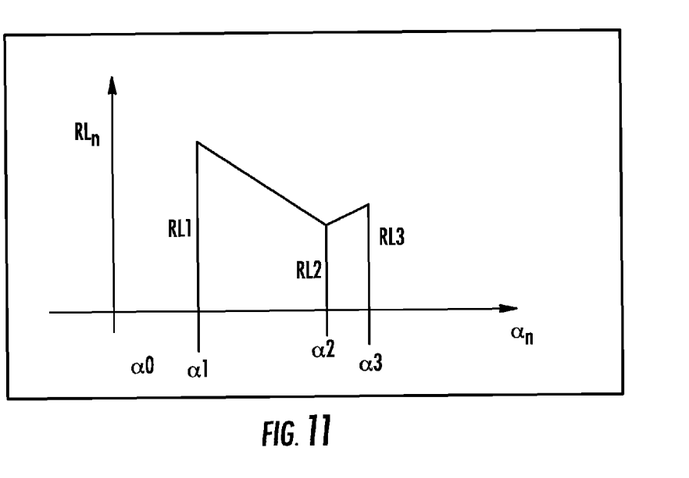
FIG. 11 is a graphical depiction of different distances from various locations of the workpiece with respect to a fixed location.

FIG. 11 illustrates a graphical depiction of different distances RLn for various locations on the workpiece with respect to the mirror. Using these distances, the actual workpiece height can be derived.

The distance from the workpiece to the mirror is at its greatest distance at RL1 and greatest angle $\alpha 1$. The distances gradually become smaller until at RL2 and $\alpha 2$ the distance reaches a minimum before gradually becoming larger and reaching a second maximum at RL3 and angle $\alpha 3$. By constantly comparing the generated $RL_n$ values with each other, the smallest value at RL2 and the biggest at RL1 are determined. With these two values the actual workpiece height is derived as follows:

$$WP1^2 = RL2^2 + RL1^2 - 2*RL2*RL1*cos(\phi)$$

where $\phi = \alpha 2 - \alpha 1$

Knowing the workpiece height, WP1, the CPU 202 compares the saw blade height SB1 as adjusted and determines if this is a non-through or a through cut using the same method as described before.

If SB1 is bigger than WP1, a through cut is identified. If the guard is not detected, hence B1=O, the motor will turn off, R=O. Table 8 illustrates the various states for the embodiment of FIG. 10.

TABLE 8

Signals:

S1 = 1: Switch on
B1 = 0: blade guard not mounted
WP1: calculated work piece height
SB1: calculated saw blade height
WP1 < SB1 => R1 = "0"
WP1 >= SB1 => R1 = "1"

If the saw blade height SB1 is less than actual workpiece height WP1 then a non-through cut is identified where guard needs to be taken off, so in this case B=0 but the tool stays on, R=1.

Figure 12:
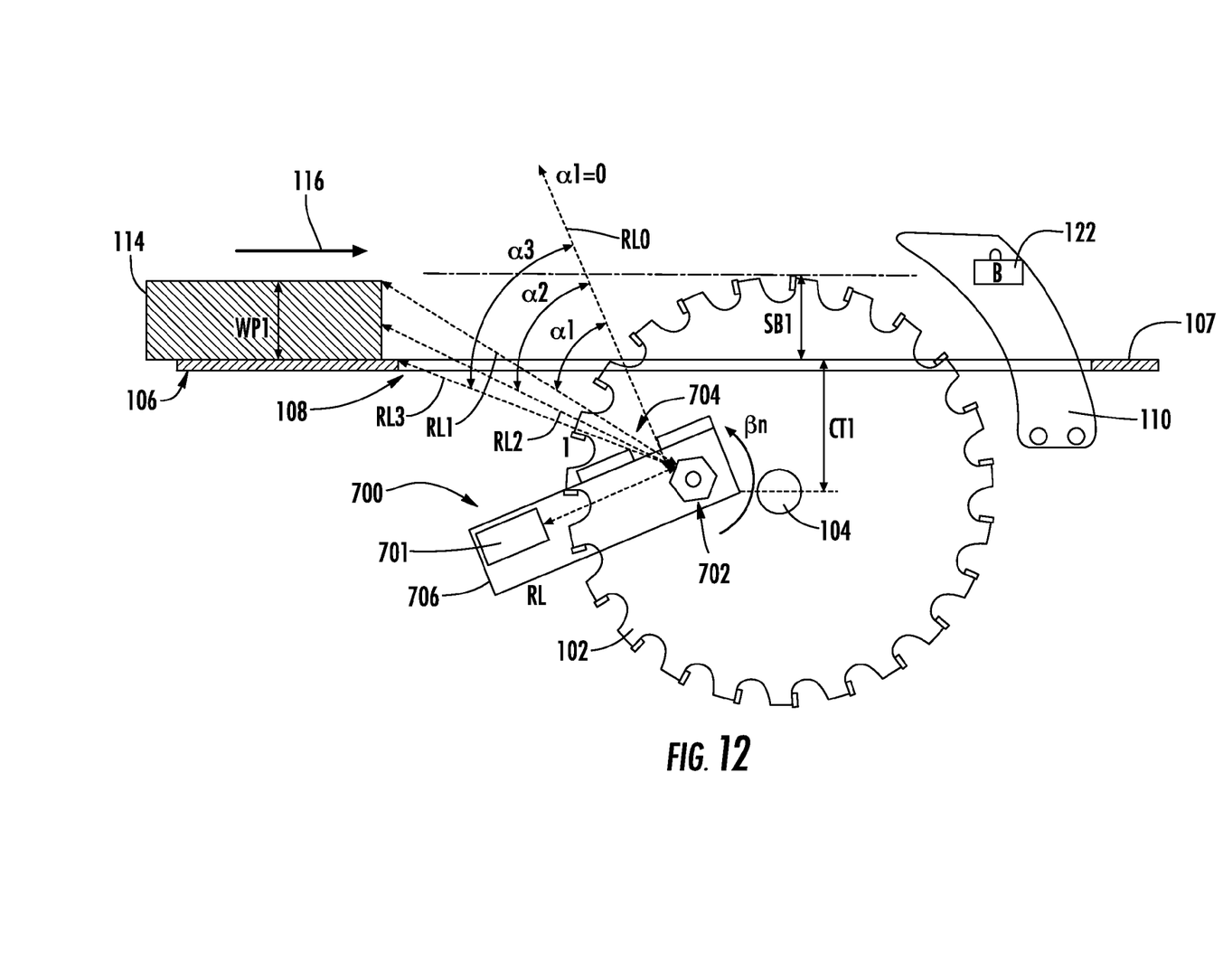
FIG. 12 is a schematic view of another embodiment of a through cut being made by a table saw with a saw blade being set too high for the work piece using a rotating laser to detect the operating condition.

FIG. 12 illustrates the same embodiment as illustrated in FIG. 9. FIG. 12, however, illustrates a change in values $RL_n$ before the workpiece 114 crosses over the opening 108.

Figure 13:
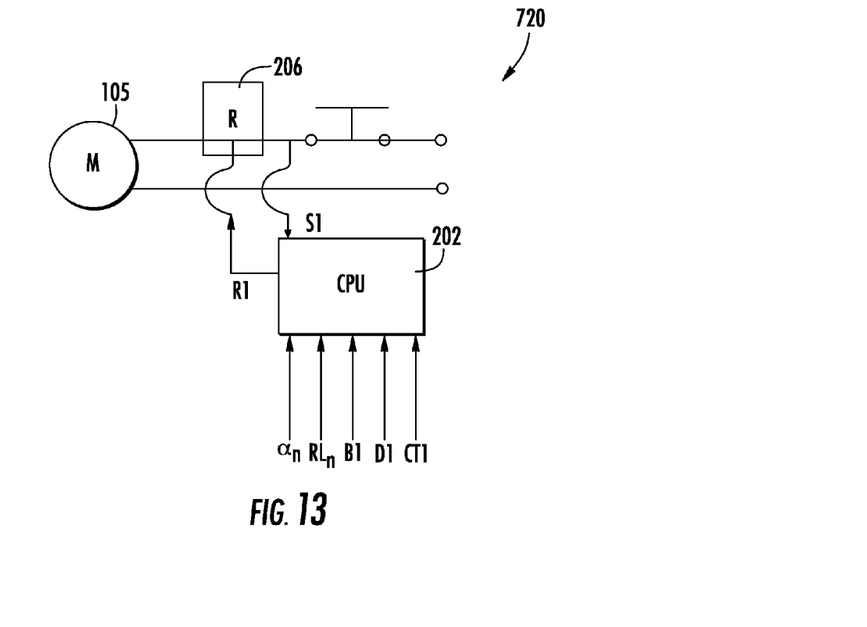
FIG. 13 is a schematic circuit diagram of another embodiment of a guard device circuit.

FIG. 13 illustrates an alternative circuit 720 indicating signal input lines. In this circuit, the motor 105, CPU 202, and relay 206 are included as in the prior circuit embodiments. In this alternative, however, the CPU 202 is configured to receive the inputs as illustrated in the figure.

Figure 14:
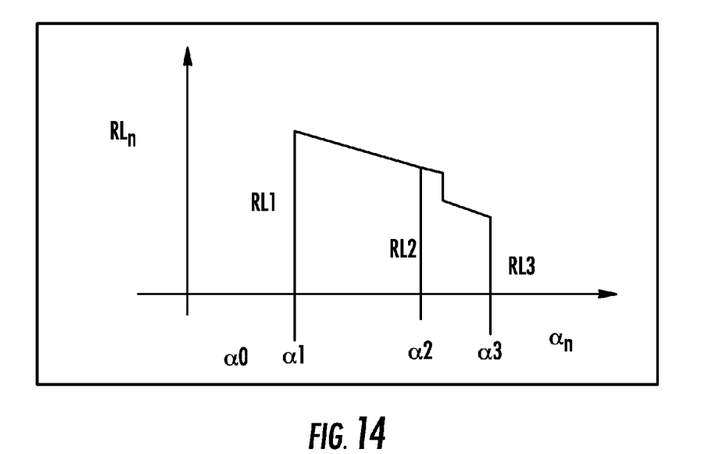
FIG. 14 is a graphical depiction of a change in the values for a distance taken from the workpiece to a fixed location as the workpiece is initially pushed towards a saw blade.

The graphical depiction of FIG. 14 shows a change in the values for $RL_n$ as the workpiece is initially pushed towards the saw blade 102 as illustrated in FIG. 12. The step configuration in the $RL_n$ values indicates that the workpiece is still "far away" from the saw blade. This information, in one embodiment is used for other features or functionalities, such as to adjust the revolutions per minute (rpm) of the saw. As the tool or motor is switched on, in one embodiment, the motor 105 adjusts rotation of the blade 102 to a very low number of revolutions per minute (rpm). The actual full blade rpm is only reached after the workpiece is actually in close proximity to the saw blade as determined by the system 700.

One advantage of this method is that the distance of the laser diode from table top surface is not needed for the determination of the actual workpiece height. Complex calibrations or factory adjustments to exactly place the laser at the desired distance MP1, like described in FIG. 7, are not needed.

One or more embodiments of the present disclosure are configured to detect whether the blade guard is missing and enables the tool and/or motor to operate only if the intended cut is actually a non-through cut.

One or more embodiments of the present disclosure are configured to detect whether the actual adjusted saw blade height and the work piece thickness match. If the height adjustment of the blade and the work piece thickness do not match a recommendation made by the manufacturer, the tool and/or the motor are disabled and are not allowed to operate.

One or more embodiments of the present disclosure are configured detect an actual work piece height. The work piece height detection is used, in one embodiment, to automatically adjust the blade height setting, by means of a motor driven height adjustment, to the recommended blade height.

In another embodiment, a motor speed setting is automatically adjusted to a recommended speed of the saw blade for this material thickness by means of an electronic motor speed controller.

DEFINITIONS

L=Laser sensor
L1=Signal from Laser sensor to CPU
T=LED Transceiver
T1=Signal from LED Transceiver to CPU
B=Blade guard sensor (microswitch, magnetic or optical sensor)
B1=Signal from Blade guard sensor to CPU
S1=Signal from Tool On-Off Switch to CPU
R=Relay (magnetic or electronic)
R1=Signal from CPU to Relay
LD=Laser distance measurement device
LD1=Measured distance from Laser tip to workpiece
H1=Height from table top to the intersection of beam from Laser L and beam from LED transceiver T
$LH_n$=Height calculated from laser signal
WP1=calculated workpiece height
MP1=Factory pre-set value for distance from laser tip to table top
$\alpha_n$=Laser beams at certain angles leaving housing of laser device RL
$\beta_n$=rotational angles of Mirror, corresponding to an $\alpha_n$
γ=Factory pre-set value for angle between laser beam and table top
φ=angle between RL2 and RL1
CT=height measurement system for measuring position of Saw blade center in respect to table top
CT1=Measured distance form center of saw blade to table top
SB1=Saw blade height above table top adjusted by the user While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A saw including a saw blade for cutting a workpiece and a motor coupled to the saw blade, the motor having an on condition to move the saw blade for cutting the workpiece and an off condition in which the saw blade is not moved, the saw comprising:
    a table top defining an opening and including a work surface, the work surface configured to support the workpiece for a workpiece movement along the table top toward the opening;
    a saw blade carriage configured to support the saw blade with respect to the table top;
    a workpiece detection system configured to detect the workpiece, the workpiece detection system including an (i) emitter/detector unit configured to transmit a beam toward the workpiece, to detect a presence of a reflected signal reflected from the workpiece indicative of a height of the workpiece when the workpiece is located in a path of the beam and an absence of the reflected signal from the workpiece when the workpiece is not located in the path of the beam, and to transmit a workpiece height signal indicative of the detected one of the presence and absence of the reflected signal from the workpiece, (ii) a processing unit operatively coupled to the emitter/detector and configured to receive the workpiece height signal, and (iii) a relay operatively coupled between the processing unit and the motor,
    wherein the processing unit is configured to provide a relay signal to the relay in response to the workpiece height signal and the relay is configured to control a blade movement of the saw blade based on the relay signal.

2. The saw of claim 1 wherein the emitter/detector unit is fixedly coupled to one of a frame of the saw and the saw blade carriage.

3. The saw of claim 2 wherein the emitter/detector unit is located on one side of the work surface and the workpiece is located on another side of the work surface.

4. The saw of claim 3 wherein the emitter/detector unit transmits the beam through the opening.

5. A saw including a saw blade for cutting a workpiece and a motor coupled to the saw blade, the motor having an on condition to move the saw blade for cutting the workpiece and an off condition in which the saw blade is not moved, the saw comprising:
    a table top defining an opening and including a work surface, the work surface configured to support the workpiece for a workpiece movement along the table top toward the opening,
    a saw blade carriage configured to support the saw blade with respect to the table top;
    a workpiece detection system configured to detect the workpiece, the workpiece detection system including an emitter/detector configured to transmit a beam toward the workpiece, to detect one of the presence of a reflected signal from the workpiece indicative of a height of the workpiece and the absence of the reflected signal from the workpiece, and to transmit a workpiece height signal indicative of the detected one of the presence and absence of reflected signal from the workpiece, a processing unit operatively coupled to the emitter/detector, and a relay operatively coupled between the processing unit and the motor, wherein the processing unit is configured to provide a relay signal to the relay in response to the workpiece height signal, wherein the relay signal is configured to control a blade movement of the saw blade
    a blade guard removably disposed above the opening; and
    a blade guard sensor configured to provide a blade guard sensor signal indicative of one of a presence and an absence of the blade guard above the opening, wherein the processing unit is configured to provide a signal in response to the workpiece height signal and the blade guard sensor signal,
    wherein the emitter/detector is fixedly coupled to one of a frame of the saw and the saw blade carriage,
    wherein the emitter/detector is located on one side of the work surface and the workpiece is located on another side of the work surface, and
    wherein the emitter/detector transmits the beam through the opening and toward the workpiece.

6. The saw of claim 5 further comprising a transceiver configured to transmit a transmit signal toward the workpiece, to receive a reflected signal reflected from the workpiece, and to transmit a presence signal to the processing unit.

7. The saw of claim 6 wherein the transceiver comprises a light beam transceiver, the transmitted signal is a transmitted light beam and the reflected signal is a reflected light beam.

8. The saw of claim 6 wherein the transceiver is located on the one side of the work surface.

9. The saw of claim 1 wherein the emitter/detector unit is fixed to the frame and is stationary with respect to the frame during movement of the saw blade carriage.

10. The saw of claim 9 further comprising a mirror, wherein the mirror is rotatably fixed to the frame at a location in the path of the transmitted beam of the emitter/detector unit.

11. The saw of claim 1, wherein the beam transmitted by the emitter/detector unit is a laser beam, the reflected signal from the workpiece is a reflected laser signal, and the emitter/detector unit is configured to receive the reflected laser signal.

12. The saw of claim 1, wherein the emitter/detector unit is arranged so as to emit the laser beam at an angle relative to the work surface, and the angle is not perpendicular to the work surface.

13. The saw of claim 12 further comprising:
a transceiver configured to transmit a transmit signal toward the workpiece, to receive a reflected signal reflected from the workpiece, and to transmit a presence signal to the processing unit,
wherein the processing unit is configured to receive the presence signal and to provide the relay signal based on the presence signal and the workpiece height signal.

14. The saw of claim 13, wherein the laser beam and the transmit signal intersect one another at a distance defined perpendicular to the work surface that is equal to a height of the saw blade above the work surface defined perpendicular to the work surface.

15. The saw of claim 14, wherein the saw blade carriage is movable relative to the table top, and the emitter/detector unit is mounted to the saw blade carriage so as to be fixed relative to the saw blade carriage and movable relative to the table top.

16. The saw of claim 13, further comprising:
a blade guard removably disposed above the opening and configured to at least partially enclose the saw blade; and
a blade guard sensor configured to provide a blade guard sensor signal indicative of one of a presence and an absence of the blade guard above the opening, wherein the processing unit is configured to receive the blade guard sensor signal and provide the relay signal based upon the workpiece height signal, the presence signal, and the blade guard sensor signal.

* * * * *